United States Patent
Chrestman

(12)
(10) Patent No.: US 6,789,351 B2
(45) Date of Patent: Sep. 14, 2004

(54) INSECT TRAP WITH ELLIPTICAL OR OBLONG INLET

(76) Inventor: Gerald W. Chrestman, Box 35, Waterford, MS (US) 38685

( * ) Notice: Subject to any disclaimer, the term of this patent is extended or adjusted under 35 U.S.C. 154(b) by 0 days.

(21) Appl. No.: 10/243,882

(22) Filed: Sep. 13, 2002

(65) Prior Publication Data
US 2003/0014904 A1 Jan. 23, 2003

Related U.S. Application Data

(63) Continuation-in-part of application No. 09/803,805, filed on Mar. 12, 2001, now Pat. No. 6,505,435.

(51) Int. Cl.[7] .................................................. A01M 1/10
(52) U.S. Cl. ...................................................... 43/122
(58) Field of Search .................................... 43/107, 122

(56) References Cited

U.S. PATENT DOCUMENTS

| | | |
|---|---|---|
| 1,085,388 A | 1/1914 | Overmyer |
| 1,611,515 A | 12/1926 | Crown |
| 1,786,704 A | 12/1930 | Deibele |
| 1,858,087 A | 5/1932 | Howard |
| 1,924,379 A | 8/1933 | Reese |
| 2,014,500 A | 9/1935 | Lass |
| 4,244,135 A | 1/1981 | Harwoods |
| 4,551,941 A | 11/1985 | Schneidmiller |
| 5,231,792 A | 8/1993 | Warner |
| 5,243,781 A | 9/1993 | Carter |
| 5,392,560 A | 2/1995 | Donahue et al. |
| 5,461,822 A | 10/1995 | Green et al. |
| 5,557,880 A | 9/1996 | Schneidmiller |
| 5,596,833 A | 1/1997 | Harrie et al. |
| 5,987,809 A | 11/1999 | Cheok |
| 6,112,454 A | 9/2000 | Plato et al. |

FOREIGN PATENT DOCUMENTS

| | | |
|---|---|---|
| GB | 2 258 130 A | 2/1993 |
| IT | 259371 | 6/1928 |

*Primary Examiner*—Kurt Rowan
(74) *Attorney, Agent, or Firm*—Woodard, Emhardt, Moriarty, McNett & Henry LLP

(57) ABSTRACT

A yellow jacket and fly trap. The main body of the trap is produced from a screen and has a narrowing inlet passage with a passage defining an oblong inlet from the passage into a holding chamber. A bait receptacle is removably mounted within the passage. The inlet is formed by an interior side wall having a lower circular opening and an elliptical or oblong inlet leading into the trap.

10 Claims, 4 Drawing Sheets

INSECT TRAP WITH ELLIPTICAL OR OBLONG INLET

CROSS REFERENCE TO RELATED APPLICATION

This application is a continuation-in-part of U.S. patent application Ser. No. 09/803,805, filed Mar. 12, 2001, now U.S. Pat. No. 6,505,435.

BACKGROUND OF THE INVENTION

1. Field of the Invention

This invention is in the field of traps for catching insects and particularly, flies and yellow jackets.

2. Description of the Prior Art

Numerous traps have been devised for catching insects including flies and yellow jackets. Specifically, the prior devices include a one-way entrance passage leading into a holding chamber with the inlet side sufficiently smaller than the width of the chamber to limit the insect from escaping. A representative sample of insect traps are shown in the following U.S. patents:

| | | |
|---|---|---|
| 1,611,515 | G. S. Crown | Dec. 21, 1926 |
| 4,551,941 | Schneidmiller | Nov. 12, 1985 |
| 5,231,792 | Warner | Aug. 3, 1993 |
| 5,243,781 | Carter | Sep. 14, 1993 |
| 5,392,560 | Donahue et al. | Feb. 28, 1995 |
| 5,557,880 | Schneidmiller | Sep. 24, 1996 |
| 5,987,809 | Cheok | Nov. 23, 1999 |
| 6,112,454 | Plato et al. | September 2000 |
| 5,596,833 | Harrie et al. | January 1997 |
| 5,461,822 | Green et al. | October 1995 |
| 4,244,135 | Harwoods | January 1981 |
| 2,014,500 | Lass | September 1935 |
| 1,924,379 | Reese | August 1933 |
| 1,858,087 | Howard | May 1932 |
| 1,786,704 | Deibele | December 1930 |
| 1,085,388 | Overmyer | January 1914 |
| 2 258 130A | G.B. | February 1993 |
| 259371 | Italy | 1931 |

I have invented an improved insect trap by designing the entrance passage and bait receptacle in such a way that the insect is attracted from the receptacle through the passage and then into the chamber. Further, the entrance passage is spaced apart from the interior side wall defining the chamber to increase the difficulty of the insect crawling and escaping from the chamber.

Improved results have been obtained by configuring the inlet leading into the chamber while producing the chamber walls from screen to allow the ambient light to flood the chamber and the oblong slit. The bait receptacle is positioned in the passage with the light passing through the slit attracting the insect further in the passage and into the chamber. The bait receptacle is located externally of the insect holding chamber allowing the insect to be attracted to the bait prior to entering the holding chamber. Excellent results have been obtained in trapping flies and yellow jackets due to the oblong inlet coupled with the location of the bait receptacle relative to the holding chamber.

SUMMARY OF THE INVENTION

A trap for insects comprising a main body forming a hollow interior to hold insects. The main body includes a bottom wall with an opening extending therethrough. The main body further includes an entrance wall with a top end. The entrance wall is continuous and surrounds the opening at the bottom wall and extends upwardly therefrom to the top end forming an upwardly extending passage. The entrance wall at the top end has a non-circular, oblong slit forming an inlet into the main body to allow insects to move from the passage into the hollow interior. The entrance wall extends upwardly from the opening which is circular and tapers to the oblong slit. An insect bait receptacle is located within the passage beneath the inlet but outside of the hollow interior to attract insects into the passage. A holder is secured to the main body to hold the insect bait receptacle within the passage.

It is an object of the present invention to provide a new and improved insect trap.

A further object of the present invention is to provide a fly and yellow jacket trap with an entrance passage and bait receptacle configured and located to attract the fly and/or yellow jacket into the holding chamber.

Related objects and advantages of the present invention will be apparent by the following description.

DESCRIPTION OF THE PREFERRED EMBODIMENT

Figure 1:
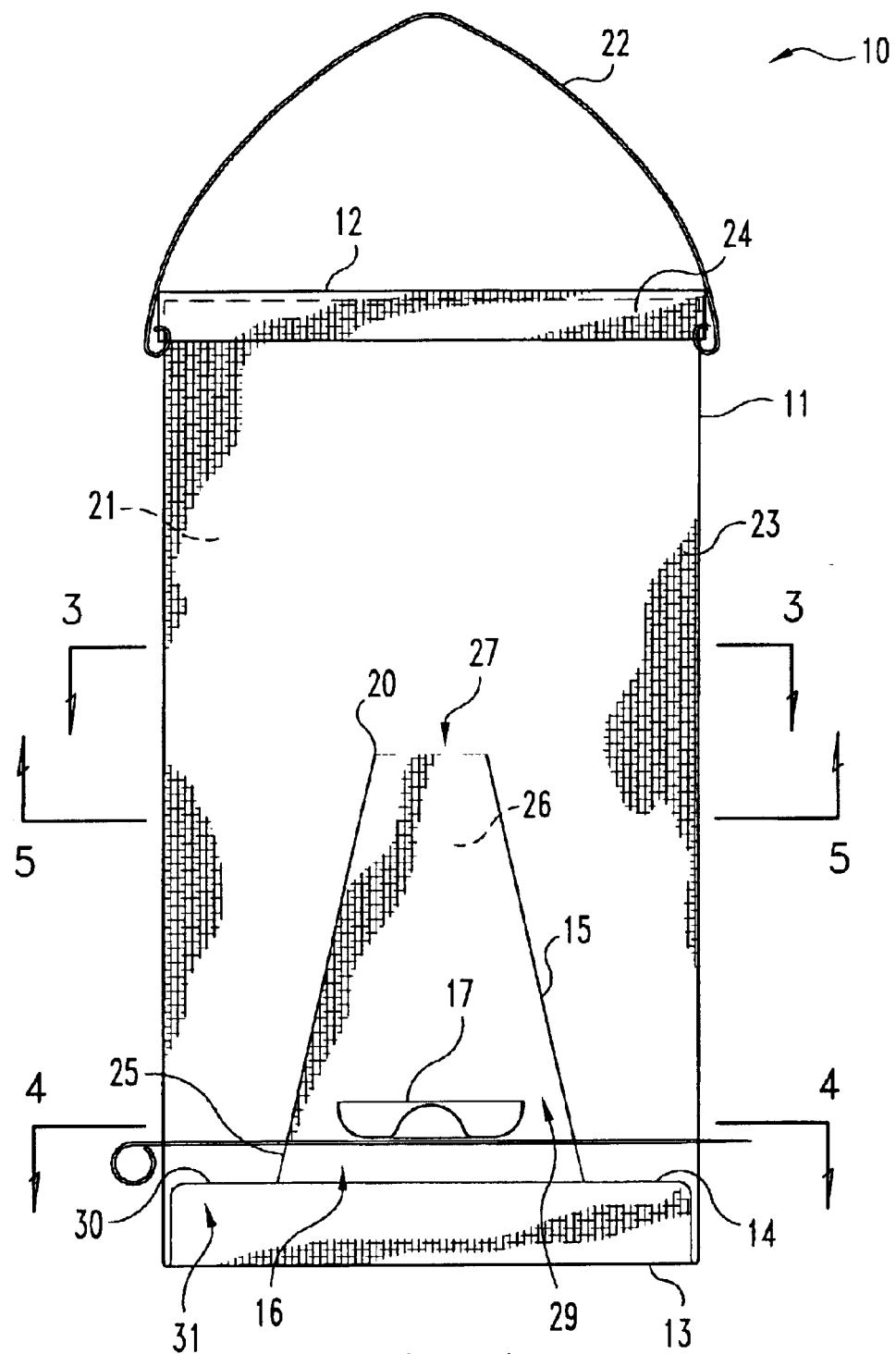
FIG. 1 is a side view of an insect trap incorporating my present invention.
Figure 2:
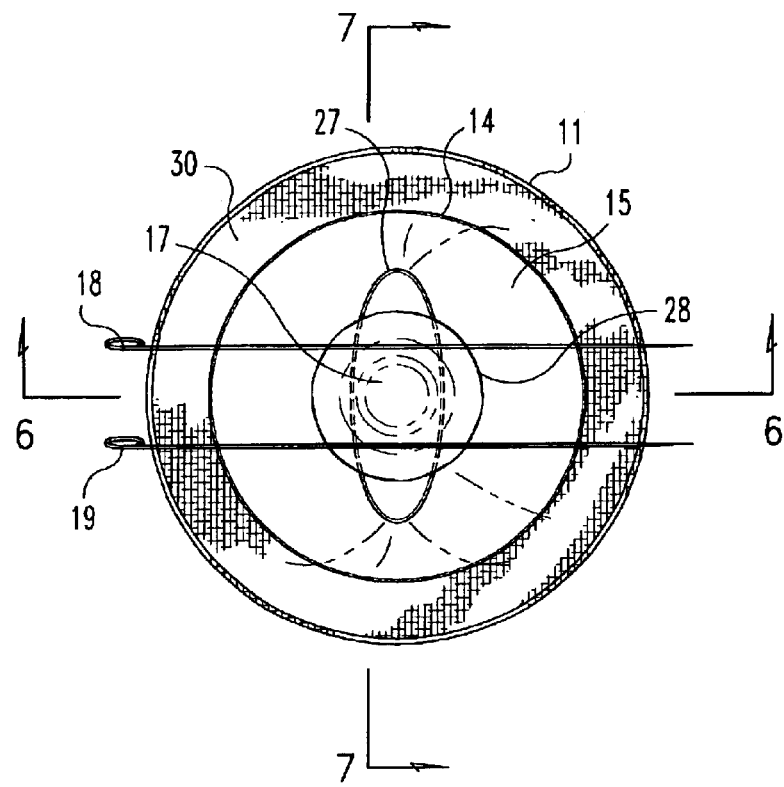
FIG. 2 is a bottom view.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a trap 10 for insects, and specifically, to trap and hold flies and yellow jackets. Trap 10 includes a cylindrical main body 11 formed by a cylindrical side wall 23 having a top end 12 and a bottom end 13. A bottom wall 14 is connected to and extends across main body 11 and is positioned upwardly from bottom end 13. An interior side wall 15 extends upwardly from bottom wall 14 into the main body 11 of the trap with wall 15 defining an opening 16 extending through bottom wall 14. An insect bait receptacle 17 is located within the passage formed by interior side wall 15 and is removably held in place within the passage by a pair of rods 18 and 19. The top end 20 of wall 15 is provided with an inlet 27 leading into the hollow interior 21 formed by side wall 23. A wire holder 22 is fastened to main body 11 to suspend the trap above the ground.

A screen forms side wall 23 and defines the holding chamber 21. Likewise, the top wall 24 is produced from screen material and may be removably attached to side wall 23 by conventional wire fastening devices to allow the wall to be removed and the trap emptied of insects. It is not, however, necessary that wall 24 be removable with the insects simply remaining in the trap. Top wall 24 is positioned atop side wall 23 and encloses the top end 12 of chamber 21.

The bottom wall 14 is produced from screen material and is mounted and connected to side wall 23 enclosing the bottom end 13 of chamber 21. Wall 14 is located upwardly from the bottom end 13 of side wall 23 forming a recess 31. Wall 14 includes an opening 16 with the interior wall 15 extending continuously around opening 16 and upwardly into the chamber towards the top end of the trap. The interior wall or entrance wall 15 has a truncated, semi-conical configuration. That is, the bottom end 25 of wall 15 extends continuously along and surrounds the opening 16 with the top 20 of wall 15 extending around and tracing an oblong slit or inlet 27. Wall 15 is produced from screen material thereby allowing light to pass into the interior of passage 26 formed by wall 15.

The slit or inlet 27 is sized smaller than opening 16 with wall 15 converging from the bottom 25 to the top 20 of wall 15 thereby defining a narrowing passage 26 as the insect flies upwardly from receptacle 17 toward slit 27. The ambient light surrounding the trap passes through the screen walls 23 and 24 with light therefore being visible from within passage 26 through inlet 27 attracting the insect from the receptacle 17 upwardly further into passage 26 and through inlet 27 into the interior 21 which forms a holding chamber. By producing walls 23, 24 and 15 from screen, a plurality of apertures are provided extending through the walls through which the ambient light is visible from within passage 26. Recess 31 is positioned beneath opening 16 and is larger in size than the opening to thereby allow the insect to fly more readily into passage 26.

An insect bait receptacle 17, such as a tray or plate, is located within passage 26 and has a continuous extending edge 28 spaced apart and located inwardly from interior wall 15 forming a gap 29. Thus, the insect may fly through opening 16 and through gap 29 to the bait atop receptacle 17. Best results have been obtained by locating receptacle 17 several inches, for example, 2 inches, above the bottom screen wall 14 requiring the insect to fly into recess 31 and then up into passage 26 to receptacle 17. Notably, receptacle 17, while located within passage 26, is not physically located within the interior 21 of the main body 11. Rods 18 and 19 extend through side wall 23 and the interior side wall 15 forming a holding plane upon which receptacle 17 removably rests. The rods may be moved in a sliding motion outwardly from the trap facilitating the removal of the bait receptacle so that fresh bait, such as, hamburger, spoiled meat, etc. may be positioned. The addition of blood on the bait will add as a further attraction.

In order to limit the escape of the insect from the trap, I have located the bottom 25 of side wall 15 inwardly from side wall 23 so that the bottom wall 14 forms a horizontal wall portion 30 between side wall 23 and wall 15 requiring the insect to traverse wall portion 30 as the insect crawls from side wall 23 to the interior side wall 15. That is, one additional wall is provided for a crawling insect that is attempting to crawl up wall 15 to the inlet. Further, the interior screen wall 15 extends into chamber 21 approximately one-third the distance from the top 12 to the bottom 13, thereby adding to the difficulty and length of walls upon which the insect must traverse. Interior wall 15 is spaced from side wall 23 at bottom 25 at least one-and-a-half inches.

Best results have been obtained by hanging the trap three to four feet above the ground. Wire holder 22 may extend through side wall 23 and top wall 24 to suspend the trap. The trap is designed to entice the insect into the holding chamber. More specifically, recess 31 provides a pre-entrance entry into passage 26 allowing for the narrowing of the overall entrance into the trap. The bait is located upwardly from the bottom of the trap and into the entrance passage requiring the insect to actually fly into the entrance passage to obtain the bait. Further, the ambient light passing through the top wall 24 and side wall 23 of the trap floods passage 26 and illuminates inlet 27 attracting the insect not only to the bait, but then upwardly further into the passage and through inlet 27 to the holding chamber. Since wall 15 is of screen material, the amount of light observable through the wall is less than the amount of light observable through inlet 27. As a result, inlet 27 has a higher light intensity attracting the insect thereto. Once inside the chamber, the length of wall 15 extending into the chamber coupled with the bottom spacing of wall 15 from side wall 23 increases the difficulty of a crawling insect from escaping from the trap.

The prior art devices disclosed in the aforementioned listed patents, typically include rectangular or square trap inlets. I have achieved superior results by using an oblong inlet 27 or a non-circular inlet configured as a slit. Likewise, the elongated slit inlet provides superior insect retention as compared to a round throat with a round or rectangular inlet. Likewise, by locating the bait externally of the holding chamber, the insect is not required to fly into the holding chamber in order to obtain the bait, but is instead attracted into the holding chamber once the insect is at the location of the bait by the illuminated slit inlet 27.

Figure 3:
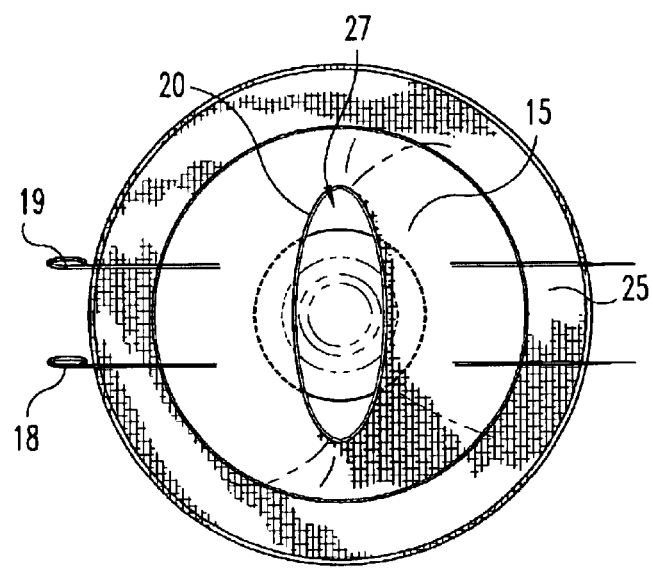
FIG. 3 is a cross-sectional view taken along the line 3—3 of FIG. 1 and viewed in the direction of the arrows.

Through use of trap 10, it as been determined that the shape of interior side wall 15 is particularly critical to achieving a high rate of trapping insects. Unlike those devices that include a interior side wall having a circular inlet leading into the hollow interior of the trap, such as shown for example, in U.S. Pat. No. 5,461,822, side wall 15 has an elliptical or oblong inlet 27 (FIG. 3). Interior side wall 15 forms a circular opening 16 at the end opposite of inlet 27. A crawling insect initially flies through circular opening 16 and then may crawl upwardly toward elliptical or oblong inlet 27 being drawn to the inlet by the ambient light showing through the inlet. Once the insect has passed through inlet 27 and located within the hollow interior of the trap, the insect may fly around attempting to escape. In the event inlet 27 is circular, then it has been observed that the insect simply flies through inlet and escapes from the trap. In the event inlet 27 is elliptical or oblong, then it has been observed that the insect will not fly through the inlet perhaps due to the restricted space through which the insect wings must traverse. Such a result was unexpected.

Figure 4:
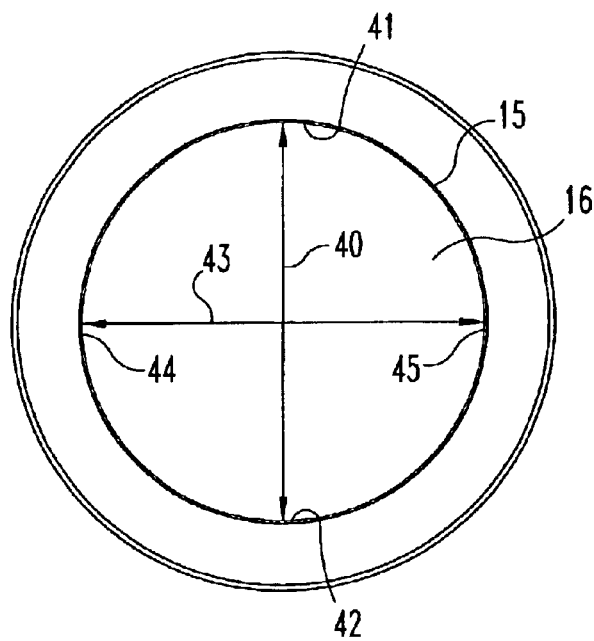
FIG. 4 is a cross-sectional view taken along the line 4—4 of FIG. 1 and viewed in the direction of the arrows.
Figure 5:
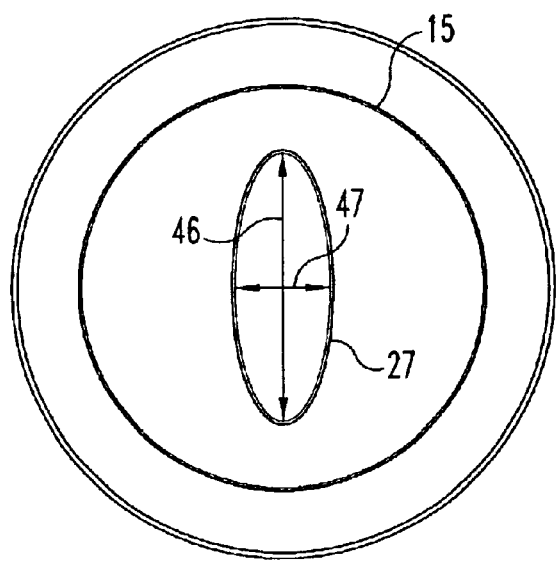
FIG. 5 is a cross-sectional view taken along the line 5—5 of FIG. 1 and viewed in the direction of the arrows.

In order to provide an elliptical or oblong inlet 27 while providing a circular opening 16, side wall 15 must be configured in a specific manner. Wall 15 is conically shaped at the location of circular opening 16 and thus traces a circle at opening 16. As wall 15 extends upwardly, the side wall 15 tapers from a circular opening 16 to the elliptical or oblong opening 27. As such, the diametrical distance 40 (FIG. 4) extending through the center of opening 16 between the mutually facing and opposite interior surfaces 41 and 42 of side wall 15 equals the diametrical distance 43, perpendicularly arranged to distance 40, and extending through the center of opening 16 between the mutually facing and opposite interior surfaces 44 and 45 at the location of opening 16. The distances 40 and 43 become unequal as the height of the interior side wall 15 increases so that distance 40 becomes a major axis 46(FIG. 5) greater in length than minor axis 47 at the location of elliptical or oblong inlet 27.

Figure 6:
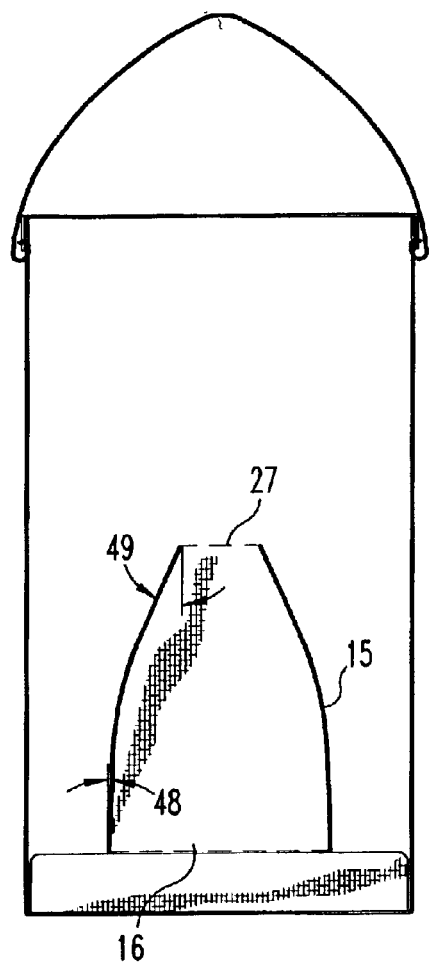
FIG. 6 is a cross-sectional view taken along the line 6—6 of FIG. 2 and viewed in the direction of the arrows.
Figure 7:
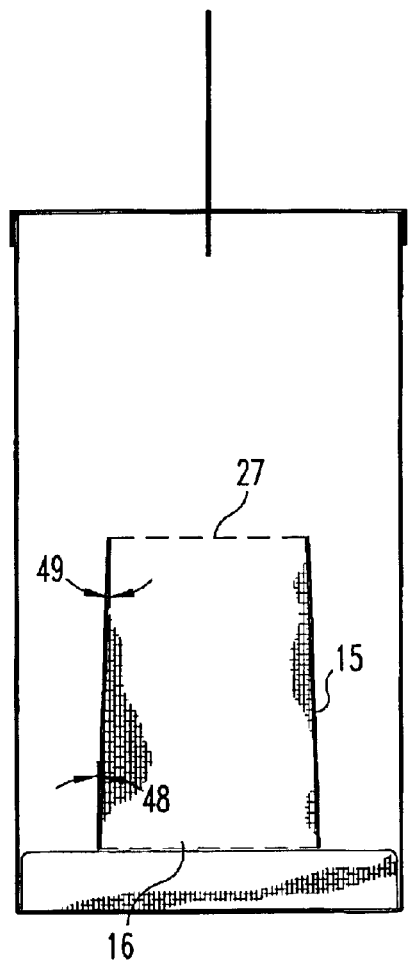
FIG. 7 is a cross-sectional view taken along the line 7—7 of FIG. 2 and viewed in the direction of the arrows.

The interior included angle 48 between the vertical and the side wall 15 at all locations surrounding circular opening 16 is constant; however, the interior included angle 49 between the vertical and the side wall 15 varies at locations surrounding the elliptical or oblong inlet 27 since inlet 27 is not circular. For example, interior included angle 49 at the end of minor axis 47 at side wall 15(FIG. 6) is greater than the interior included angle 49(FIG. 7.) at the end of major axis 48 and side wall 15. Thus, angle 49 will be different in value, at least in certain locations surrounding inlet 27, than angle 48 which is constant at locations surrounding opening 16. Side wall 15, being made from wire screen material, bends inwardly as it extends upwardly toward inlet 27 to assume the oblong configuration.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A trap for insects comprising:

a main body forming a hollow interior to hold insects, said main body including a bottom wall with a circular opening extending therethrough, said main body further includes an entrance wall with a bottom end and a top end, said entrance wall is continuous surrounding said opening of said bottom wall and extending upwardly therefrom to said top end forming an upwardly extending passage, said entrance wall at said top end being oblong and having a non-circular, oblong slit forming an inlet into said main body to allow insects to move from said passage into said hollow interior, said entrance wail extends upwardly from said opening which is circular and tapers to said oblong slit, said entrance wall has an interior surface arranged relative to vertical forming an interior included angle therebetween which changes at different locations surrounding and at said inlet; said entrance wall is circular at said bottom end to match said opening of said bottom wail;

an insect bait receptacle located within said passage beneath said inlet but outside of said hollow interior to attract insects into said passage; and, a holder secured to said main body to hold said insect bait receptacle within said passage.

2. The trap of claim 1 wherein:

said main body includes a side wall and top wall connected together with said top wall extending across said side wall enclosing said interior with said side wall and said top wall including a plurality of apertures that extend therethrough allowing ambient light to be visible from within said passage and through said oblong slit to attract an insect through said slit toward the ambient light.

3. The trap of claim 2 wherein:

said angle is constant at locations surrounding said opening.

4. The trap of claim 1 wherein:

said entrance wall has an interior surface with mutually facing surfaces surrounding said oblong slit with a major axis and a minor axis arranged perpendicularly to said major axis, said major axis extends at said oblong slit a first distance between said mutually facing surfaces and said minor axis extends at said oblong slit a second distance between said mutually facing surfaces with said first distance greater in length than said second distance.

5. The trap of claim 4 wherein:

said major axis extends at said opening a third distance between said mutually facing surfaces and said minor axis extends at said opening a fourth distance between said mutually facing surfaces with said third distance and said fourth distance equal in length.

6. The trap of claim 5 wherein:

said main body includes a side wall and said holder includes means connected to said side wall to hold said receptacle.

7. A yellow jacket trap comprising:

a cylindrical screen forming a side wall and defining a holding chamber for yellow jackets, said chamber including a top end and a bottom end;

a top screen wall connected to and positioned atop said side wall enclosing said top end of said chamber;

a bottom screen wall connected to said side wall enclosing said bottom end of said chamber, said bottom screen wall including a circular opening extending therethrough;

an interior screen wall with a bottom portion connected to said bottom screen wall and extending continuously around said circular opening and upwardly into said chamber toward said top end, said interior screen wall having a top portion with a slit thereat allowing insects within said passage to move into said chamber, said interior screen wall includes an interior surface arranged relative to vertical forming an interior included angle different at said slit than at said opening, said interior included angle being constant surrounding said opening but varying at locations surrounding said slit, said interior screen wall being circular at said bottom portion to match said circular opening in said bottom screen wall and oblong at said slit of said top portion; and, an insect bait receptacle located within said passage but outside of said chamber.

8. The yellow jacket trap of claim 7 wherein:

said opening is circular allowing a yellow jacket to fly therethrough whereas said slit is elliptical with a major axis and a minor axis to limit a yellow jacket from flying therethrough.

9. The yellow jacket trap of claim 8 and further comprising:

a device connected to said cylindrical screen holding said receptacle within said passage.

10. The yellow jacket trap of claim 9 wherein:

said interior screen wall at said slit has a major axis and a minor axis arranged perpendicularly to said major axis, said included angle at said minor axis at said interior screen wall is greater than said included angle at said major axis at said side wall.

* * * * *